July 22, 1930.  F. L. MORSE  1,770,989
DRIVE CHAIN
Filed Sept. 18, 1924
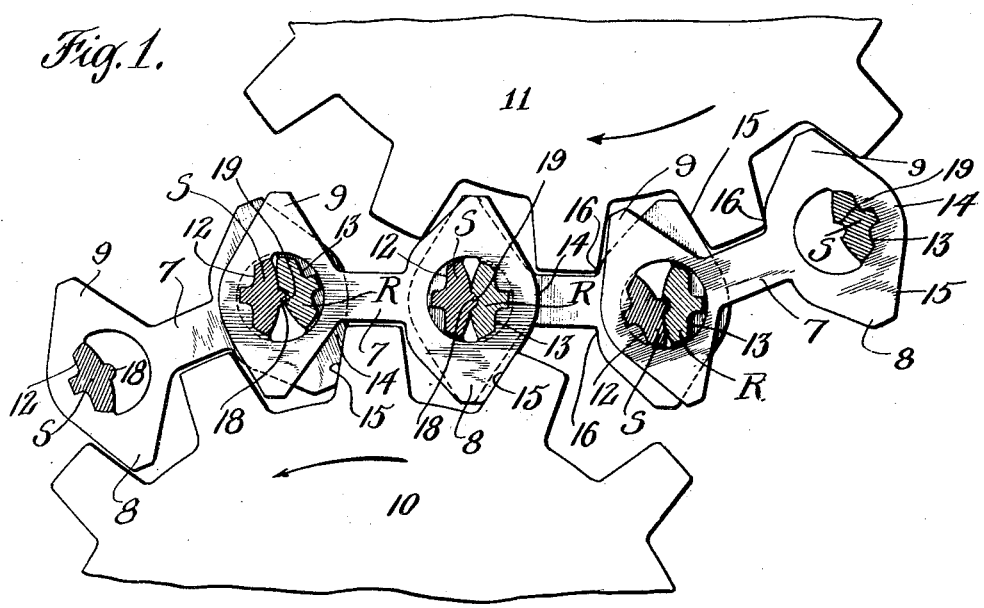
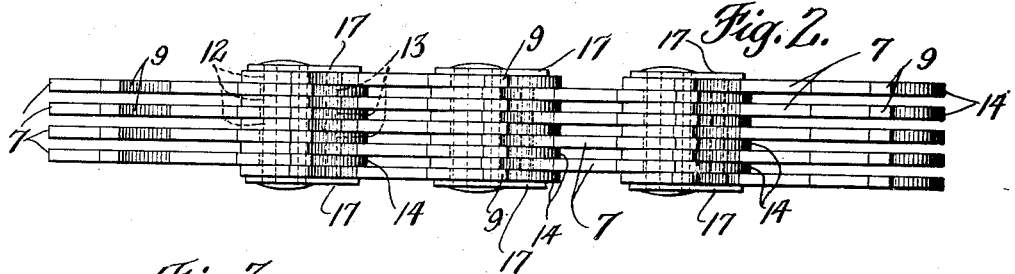
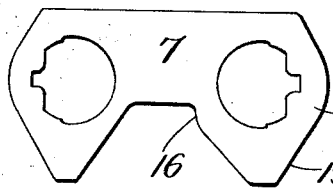
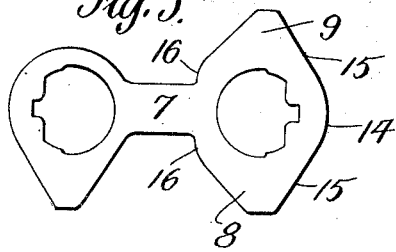
INVENTOR
Frank L. Morse
BY
Synnestvedt & Lechner
ATTORNEYS Patented July 22, 1930

1,770,989

UNITED STATES PATENT OFFICE

FRANK L. MORSE, OF ITHACA, NEW YORK, ASSIGNOR TO MORSE CHAIN COMPANY, A CORPORATION OF NEW YORK

DRIVE CHAIN

Application filed September 18, 1924. Serial No. 738,329.

The invention relates to drive chains and more particularly to that class in which the links are made up of a plurality of overlapping plates adapted to arch over sprocket teeth and joined by two part pintles.

One of the primary objects of this invention is the provision of a workable joint that will have an equal angular bend in either direction from the straight line run of the chain.

Another object of this invention is the provision of means whereby the pintle parts are prevented from slipping transversely with respect to one another.

Still another object of this invention is to provide a chain which is simple to manufacture and which will have long life.

How the foregoing together with such other objects and advantages as may hereinafter appear, or are incident to my invention, are realized, is illustrated in preferred form in the accompanying drawings wherein:

Fig. 1 is a side elevation showing a portion of my improved chain with the pintles shown in section.

Fig. 2 is a plan view of a portion of the chain.

Fig. 3 is a detailed view of a two part pintle showing a modified form of projecting rib and recess.

Figs. 4 and 5 are detailed views of modified forms of link plate.

Referring more particularly to Figs. 1 and 2 it will be seen that the chain is made up of links composed of a plurality of plates 7 provided with teeth 8 and 9 on either edge thereof, adapted to engage sprocket teeth, the link teeth 8 engaging the teeth of the sprocket 10 and the link teeth 9 engaging the teeth of the sprocket 11. In this instance the sprocket 10 is to be considered the driver and the sprocket 11 the driven wheel or idler, although the chain would operate in precisely the same manner should the wheels be arranged vice versa. The plates of adjoining links are connected by two part pintles comprising a seat pin S and a rocker pin R. These pins extend through openings in the link plates at the point of overlaps, the openings being of such contour that the seat pins S securely socket at 12 in the plates of one link and the rocker pins R securely socket at 13 in the plates of the adjoining link, clearance being provided for the rocker pins in the openings carrying the seat pins, and for the seat pins in the openings carrying the rocker pins.

If desired the chain may be so constructed that the rocker and seat pins remain the same designated part throughout the run of the chain, that is to say, the rocker pin, namely the one which is carried by the link portion that is supported on the sprocket wheel, will remain the rocker pin on either the driving or driven sprocket; and the seat pin, namely the one which is carried by the link portion that turns free of the sprocket wheel, will remain the seat pin on either the driving or driven wheels. This is brought about by the configuration of the link plates and by having the corresponding pintle parts of each link facing in the same direction. The teeth at one end 14 of each link plate have a width in a direction longitudinal of the plate, greater than the width of the teeth at the other end whereby the diagonally opposite faces 15 and 16 of the wider teeth are the driving faces. As clearly shown in Fig. 1 it will be seen that the faces 15 receive the driving thrusts from the driver 10 and the faces 16 transmit the driving thrusts to the driven wheel or sprocket 11.

As one means for holding the links of the chain together I have shown washers 17 riveted upon the outside of the seat pins S which extend beyond the width of the links. The rocker pins R are here shown of a length substantially equal to the width of the links, the washers 17 serving to hold them against displacement. It is to be understood that any other convenient holding means might be employed.

The pintle parts are so positioned in the links that the general plane thereof is substantially at right angles to the line of the links when in straight run and this coupled together with the symmetrical design of the pintle parts makes for a workable joint that will bend equally in either direction, the curved central projection 18 and complementary recess 19 acting to align the joint in its physical centre. Fig. 3 shows a modified form of this central projection in the form of an involute tooth 20 another possibility being of V-form. The advantages of providing this central projection will be appreciated when it is understood that there is a point in the run of the chain over the sprocket where a reversal of strain takes place which creates a tendency for one joint member to slip across the face of the other, such tendency also existing when both strands of the chain are pulled tight. Such slippage would soon result in wearing the sides of the holes to the extent of rendering the chain ineffective as a rocker joint silent chain.

Fig. 4 shows a modified form of link plate adapted for use in chain drives where the necessity for backward bend of the chain is not essential.

Fig. 5 shows a simplified form of link plate in which an outwardly extending tooth 9 is provided only at one end of the plate.

I claim:

1. In a rocker joint chain, the combination with links composed of a plurality of plates having sprocket tooth engaging teeth on either edge, of a two-part pintle comprising a seat pin and a rocker pin each having convex adjacent bearing surfaces, said pins being positioned to allow of equal rock in either direction from the position they assume when the chain is in straight run, and said pins having means at said bearing surfaces for preventing transverse slippage of the pins with respect to one another.

2. In a rocker joint chain, the combination with links composed of a plurality of plates having sprocket tooth engaging teeth on either edge, of a two-part pintle comprising a seat pin having a curved bearing surface and a projecting rib, and a rocker pin having a curved bearing surface for rocking upon the curved surface of the seat pin and a recess for receiving said projecting rib to prevent transverse slippage of the pintle parts with respect to one another, said pins being positioned to allow of equal rock in either direction from the position they assume when the chain is in straight run.

3. In a rocker joint chain, the combination with links composed of a plurality of plates having sprocket tooth engaging teeth on either edge, of two-part pintles comprising a seat pin and a rocker pin each having convex adjacent faces, said pins being positioned to allow of equal bend of the links in either direction, one of the pins having a projection and the other a complementary recess to prevent transverse slippage of the pintle parts with respect to one another.

4. In a rocker joint chain, the combination with links composed of a plurality of plates having sprocket tooth engaging teeth on either edge, of two-part pintles comprising a seat pin and a rocker pin, said pins being positioned to allow of equal bend of the links in either direction, and means for preventing transverse slippage of the pins with respect to one another.

In testimony whereof, I have hereunto signed my name.

FRANK L. MORSE.